W. LUPTON.
RESILIENT WHEEL.
APPLICATION FILED NOV. 14, 1911.
1,064,353.
Patented June 10, 1913.
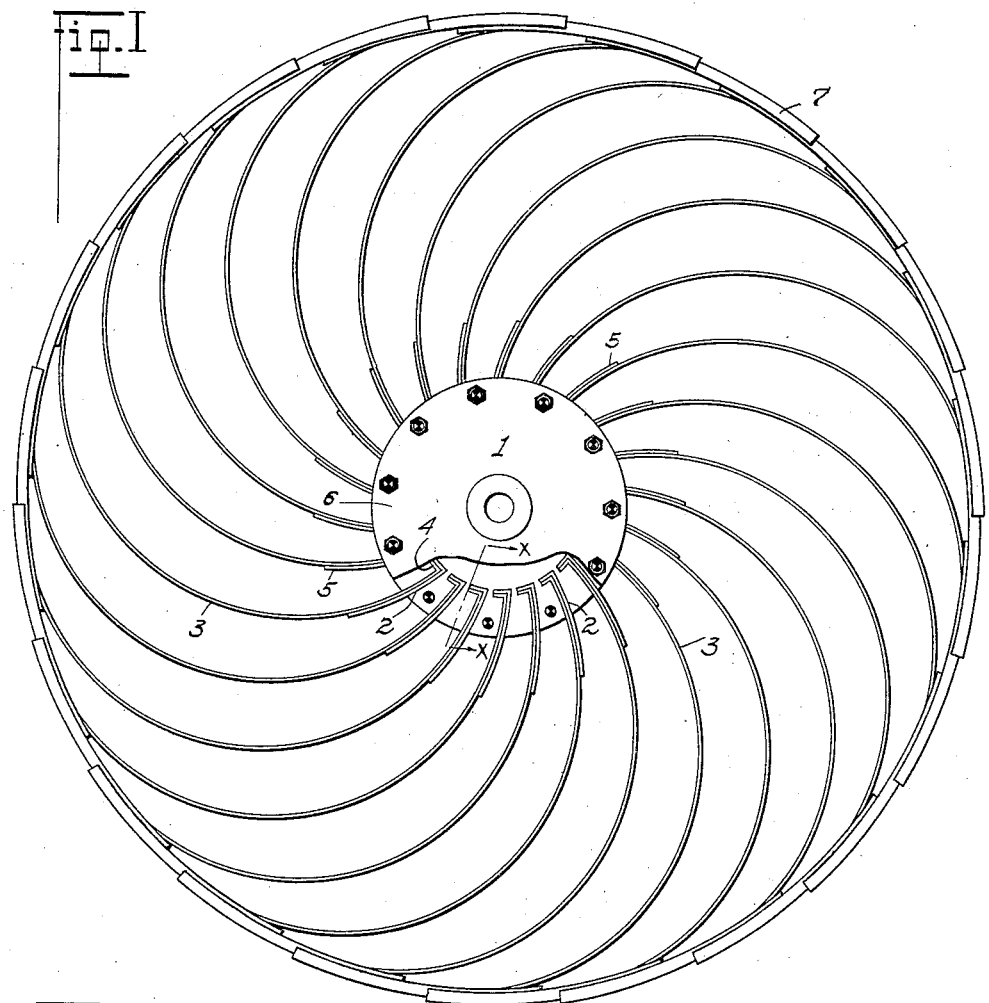
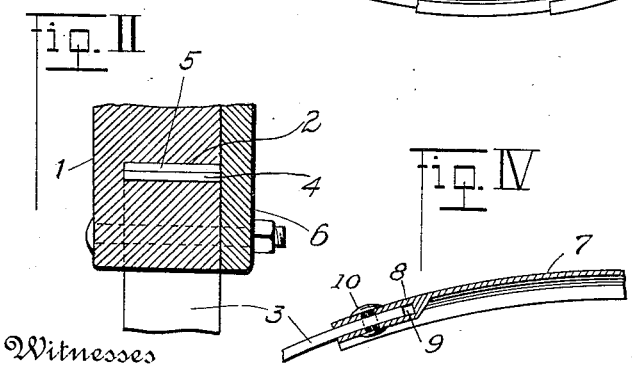
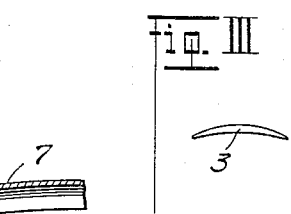
Witnesses
Inventor
Wm. Lupton
By Percy S. Webster
Attorney

UNITED STATES PATENT OFFICE.

WILLIAM LUPTON, OF LODI, CALIFORNIA.

RESILIENT WHEEL.

1,064,353.　　　　Specification of Letters Patent.　　Patented June 10, 1913.

Application filed November 14, 1911. Serial No. 660,260.

*To all whom it may concern:*

Be it known that I, WILLIAM LUPTON, a citizen of the United States, residing at Lodi, in the county of San Joaquin, State of California, have invented certain new and useful Improvements in Resilient Wheels; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in vehicle wheels, of all kinds, the object of the invention being to produce a wheel which will have a resilient and cushion effect without necessitating the use of pneumatic tires, whereby the trouble and expense of such pneumatic tires will be done away with.

A further object of the invention is to produce a simple and inexpensive device, and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1 is a side elevation partly broken out of my complete wheel. Fig. 2 is a sectional view taken on a line X—X of Fig. 1. Fig. 3 is an end view of one of the resilient spokes of the wheel. Fig. 4 is a sectional view of a hood adapted to fit over the tread sections of the wheel.

Referring now more particularly to the characters of reference on the drawings, 1 designates the hub of the wheel adapted to be mounted on the usual axle. This hub is solid around its central orifice and is provided with a plurality of angle shaped slots 2, the inner ends of said slots following the circumferential contour of the wheel and the outer ends of such slots being slightly curved, as shown. Disposed in said slots 2 are curved spring spokes 3 having projecting flanges 4 on their inner ends which fit into the inner ends of the slots 2. These spokes 3 having a similar shaped reinforcing member 5 of lesser length also disposed in said slots and projecting against said spokes 3 for a short distance beyond the hub 1 to act as a reinforcement and to prevent said spokes from bending or breaking at the point of entering said hub 1.

The spokes 3 are held in position in the slots by means of an outside plate 6, which bolts over the face of the hub 1 and against the spokes 3 and members 5 holding them in position. These spokes 3 curve outward as shown and each is provided at its outer end with a hood structure hereinafter described. Said spokes are also curved in cross section throughout their length as shown in Fig. 3 which adds strength to them. On the end of each spoke 3 is a hood member 7 having a solid portion 8 provided with a slot 9 into which the end of the member 3 fits and is secured therein by a rivet 10. These hoods form a reinforcing means for the points of the spokes 3 and by over-lapping each other as shown in the drawings, they form a substantially continuous rim to prevent the spokes 3 from being bent. As will readily be seen these spokes form a resilient wheel which will compensate for the jolts and jars encountered, as the same rides along over the surface of the earth.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

A device of the character described comprising a hub, a plurality of curved spring spokes secured in said hub, a hood member on the outer end of each spoke, said hood member comprising a hood member proper, a solid portion on said hood member, such solid portion being provided with a slot adapted to receive the end of said spoke, rivets projecting through the solid member and the spoke, each of said hood members overlapping its adjacent hood member, as described.

In testimony whereof I hereunto affix my signature in presence of two witnesses.

WILLIAM LUPTON.

Witnesses:
　STEPHEN N. BLEWETT,
　FRANK H. CARTER.

Copies of this patent may be obtained for five cents each, by addressing the "Commissioner of Patents, Washington, D. C."